United States Patent
Kasamura et al.

(10) Patent No.: US 7,424,078 B2
(45) Date of Patent: Sep. 9, 2008

(54) SYNCHRONOUS COMPENSATOR ADAPTIVELY DEFINING AN ENABLE RANGE FOR SYNCHRONOUS COMPENSATION

(75) Inventors: Kenji Kasamura, Tokyo (JP); Yasuhiro Takata, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 555 days.

(21) Appl. No.: 11/053,946

(22) Filed: Feb. 10, 2005

(65) Prior Publication Data

US 2005/0265502 A1    Dec. 1, 2005

(30) Foreign Application Priority Data

May 26, 2004  (JP)  .............................. 2004-155843

(51) Int. Cl.
*H04L 7/00*  (2006.01)
(52) U.S. Cl. ....................... 375/365; 375/346; 375/359; 375/365; 375/366; 375/371; 375/373; 375/374; 375/375
(58) Field of Classification Search ................. 375/145, 375/149, 293, 346, 359, 363, 365, 366, 371, 375/373–375
See application file for complete search history.

(56) References Cited

U.S. PATENT DOCUMENTS

| 4,974,081 | A | * | 11/1990 | Yokogawa | ................... | 348/542 |
| 5,946,358 | A | | 8/1999 | Horimoto | | |
| 6,246,291 | B1 | * | 6/2001 | Schuur et al. | ............... | 331/1 R |
| 6,317,441 | B1 | * | 11/2001 | Nakajima | ................... | 370/509 |
| 6,556,592 | B1 | | 4/2003 | Kasuya | | |
| 2004/0242251 | A1 | * | 12/2004 | Hagiwara | ................... | 455/502 |

\* cited by examiner

*Primary Examiner*—Shuwang Liu
*Assistant Examiner*—Kabir A Timory
(74) *Attorney, Agent, or Firm*—Studebaker & Brackett PC; Donald R. Studebaker

(57) ABSTRACT

In the synchronous compensator, a load generator loads a bit counter with data in dependence upon whether or not a detection signal from a UW detector falls within the range indicated by an enable signal from a synchronous compensator circuit, thereby excluding the detection signal appearing far from the normal position to establish an appropriate synchronous compensation. The synchronous compensation is thus accomplished on the basis of normally received signal waves without picking up abnormal waves supposed as reflected waves.

3 Claims, 9 Drawing Sheets

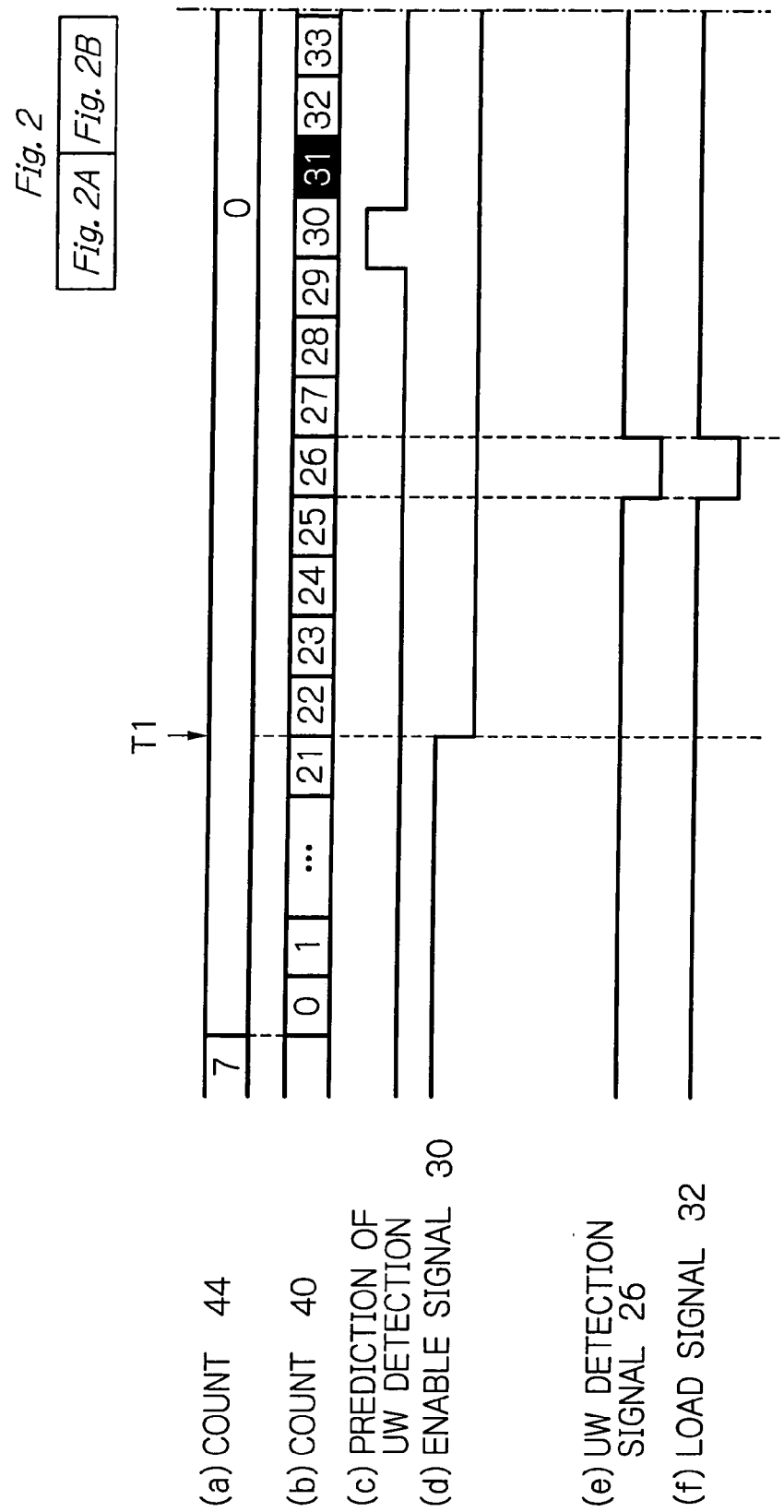

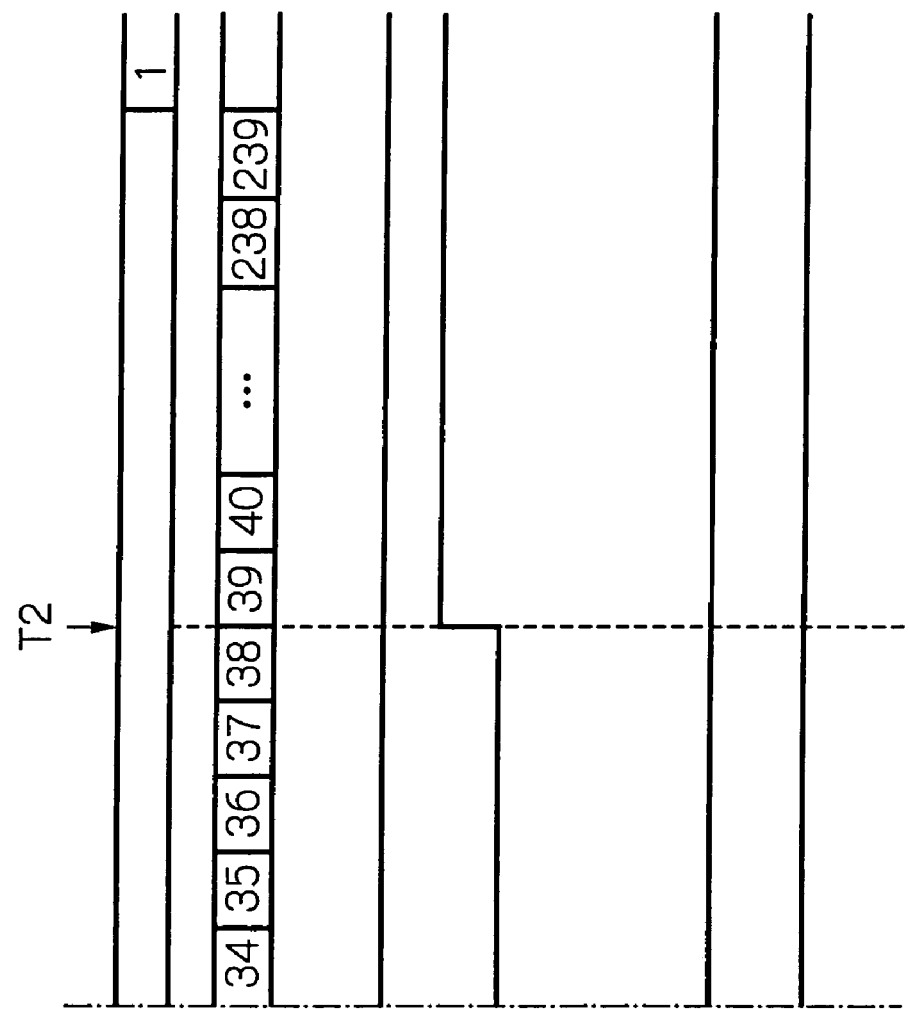

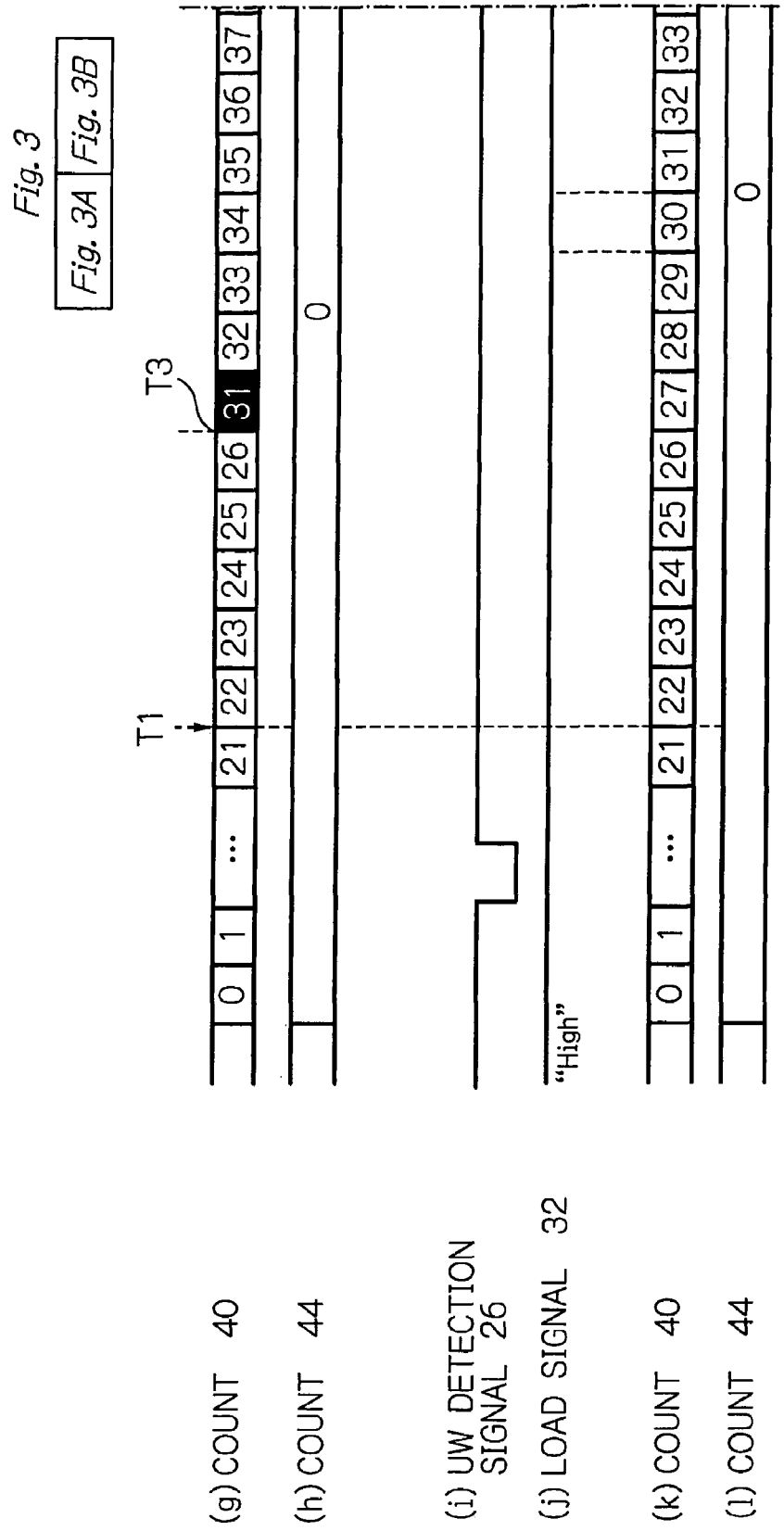

SYNCHRONOUS COMPENSATOR ADAPTIVELY DEFINING AN ENABLE RANGE FOR SYNCHRONOUS COMPENSATION

BACKGROUND OF THE INVENTION

1. Field of the Invention

The present invention relates to a synchronous compensator, and more specially to a synchronous compensator for correcting the synchronization of electromagnetic waves received by a mobile telephone set such as PHS (Personal Handyphone System) terminal.

2. Description of the Background Art

The PHS system uses time slots for transmission and reception, each of which includes 240 bits. Four time slots for transmission and other four time slots for reception constitute a frame of eight time slots. When a mobile or personal station receives data transmitted from a cell station, it is required to synchronize or adjust the reception slot of the personal station to the transmission timing of the cell station. Such a timing adjustment is called a synchronous compensation.

The PHS system may utilize a method of synchronous compensation using unique words (UWs). Such a system is adapted to detect a unique word in the 240 bits of received data. Then, the detected unique word functions as a load signal. Fixed data supplied after the load signal are taken in an internal counter. The internal counter is adapted to count the 240 bits eight times to generate sync timing on the basis of a count in the counter. As the count is corrected according to the input timing of the received data, the sync timing is also corrected according to the input timing.

The conventional synchronous compensator comprises a UW detector, a bit counter, a slot counter and a sync timing generator. The received data are applied to the UW detector. The UW detector supplies the detected UW detection signal as the load timing signal to the load terminal of the modulo-240 bit counter having its full count of 240. The bit counter provides the function of indicating the bit position of received data. The bit counter has its data terminal fed with fixed data. The bit and slot counters have their clock terminal supplied with the same clock signal. The bit counter has its output terminal supplying an eight-bit [7:0] signal to one terminal of the sync timing generator. The bit counter also has its carry output terminal developing a carry output signal to the enable terminal of the slot counter. The slot counter has its full count of eight and the function of indicating the slot number. The slot counter supplies a three-bit [2:0] signal to another terminal of the sync timing generator. The sync timing generator is responsive to those signals supplied to generate several timing signals.

The above-described circuits are disclosed, for example, in U.S. Pat. Nos. 5,946,358 and 6,556,592 to Horimoto and Kasuya, respectively. The receiver of the mobile communication equipment disclosed in the Horimoto patent is adapted to generate a clock signal from a digital signal received by the demodulator and detect a UW word synchronized with the bit clock to output a UW detection signal. The comparator determines the direction of the phase shift of the detected signal with respect to the generated clock, and the counter counts the clocks for the phase shift of the bit clock with respect to the generated clock. According to direction and amount of the phase shift, the receiver varies frequency-division ratio of the programmable counter in the operational clock generator, thus establishing high-precision transmission.

In the method and circuit for correcting clock synchronization disclosed in the Kasuya patent, one signal from a frequency divider which frequency-divides a master clock by a phase difference signal for the network synchronization and another signal from another frequency divider which frequency-divides the clock on an ISDN (Integrated Service Digital Network) side by a reset release signal are supplied to a phase comparator in response to the compensation enable signal, and a phase difference signal is supplied to the other frequency divider and a third frequency divider to output an air interface clock from the latter frequency divider. Those frequency dividers are adapted for correcting clock synchronization from the state where the synchronization is established between the air interface and the ISDN network to thereby commence their frequency-dividing operation at the same timing. Thus, the PHS cell station is able to communicate with a personal station without losing the latter.

The above-described synchronous compensator circuit is adapted for correcting its synchronization whenever having detected the UW detection signal. Usually, during transmission the reception timing of data received is almost so constant that synchronization is not corrected suddenly and abruptly.

It may happen that the waves directly transmitted are intercepted by an obstacle or the like, but only the waves reflected by the obstacle are received with a time delay. In this case, what were received are waves indirectly supplied, and therefore the synchronous compensator may essentially not compensate for its erroneous synchronization. However, the waves are received without being discriminated. The conventional synchronous compensators disclosed in the above-indicated U.S. patents compensate for, whenever the compensator detects a UW word in the waves received, the erroneous synchronization even for the essentially undesired waves. If the reflected wave involves a considerably larger time delay, the compensators then correct synchronization more extensively. When this situation continues, the synchronous compensator may cause out-of-synchronism.

SUMMARY OF THE INVENTION

It is an object of the present invention to provide a synchronous compensator which is able to prevent synchronous compensation from being carried out on reflected waves.

The invention provides a synchronous compensator which comprises a detector for detecting a specific word to output a detection signal, a first counter loaded with data supplied for incrementing in response to the detection signal and outputting a carry signal, a second counter for incrementing according to the carry signal, a sync timing generator for generating a sync timing signal according to outputs supplied from the first and second counters, an enable generator for generating an enable signal associated with a compensation range on the basis of the output from the first counter and a value of a range to enable, and a load generator for generating a loading signal loading the first counter with the data on the basis of the enable signal and the detection signal.

In the synchronous compensator in accordance with the present invention, a load generator loads a bit counter with data in dependence upon whether or not a detection signal from a UW detector falls within the range indicated by an enable signal from a synchronous compensator circuit. A detection signal appearing far from the normal position is excluded by means of an enable range thus adaptively defined to thereby establish an appropriate synchronous compensation.

BRIEF DESCRIPTION OF THE DRAWINGS

The objects and features of the present invention will become more apparent from consideration of the following detailed description taken in conjunction with the accompanying drawings in which:

FIG. 2 shows how to combine FIGS. 2A and 2B;

FIGS. 2A and 2B are, when combined as shown in FIG. 2, a timing chart of the signals useful for understanding the operation of the synchronous compensator shown in FIG. 1;

FIG. 3 shows how to combine FIGS. 3A and 3B;

FIGS. 3A and 3B are, when combined as shown in FIG. 3, a timing chart of the signals useful for understanding the operation of the synchronous compensator shown in FIG. 1 when detecting a UW word outside the range;

DESCRIPTION OF THE PREFERRED EMBODIMENTS

With reference to the accompanying drawings, a preferred embodiment of a synchronous compensator according to the present invention will be described in detail. The embodiment is a synchronous compensator 10 to which the present invention is applied. The portions not directly relevant to understanding the present invention will neither be described nor shown for simplicity.

Figure 1:
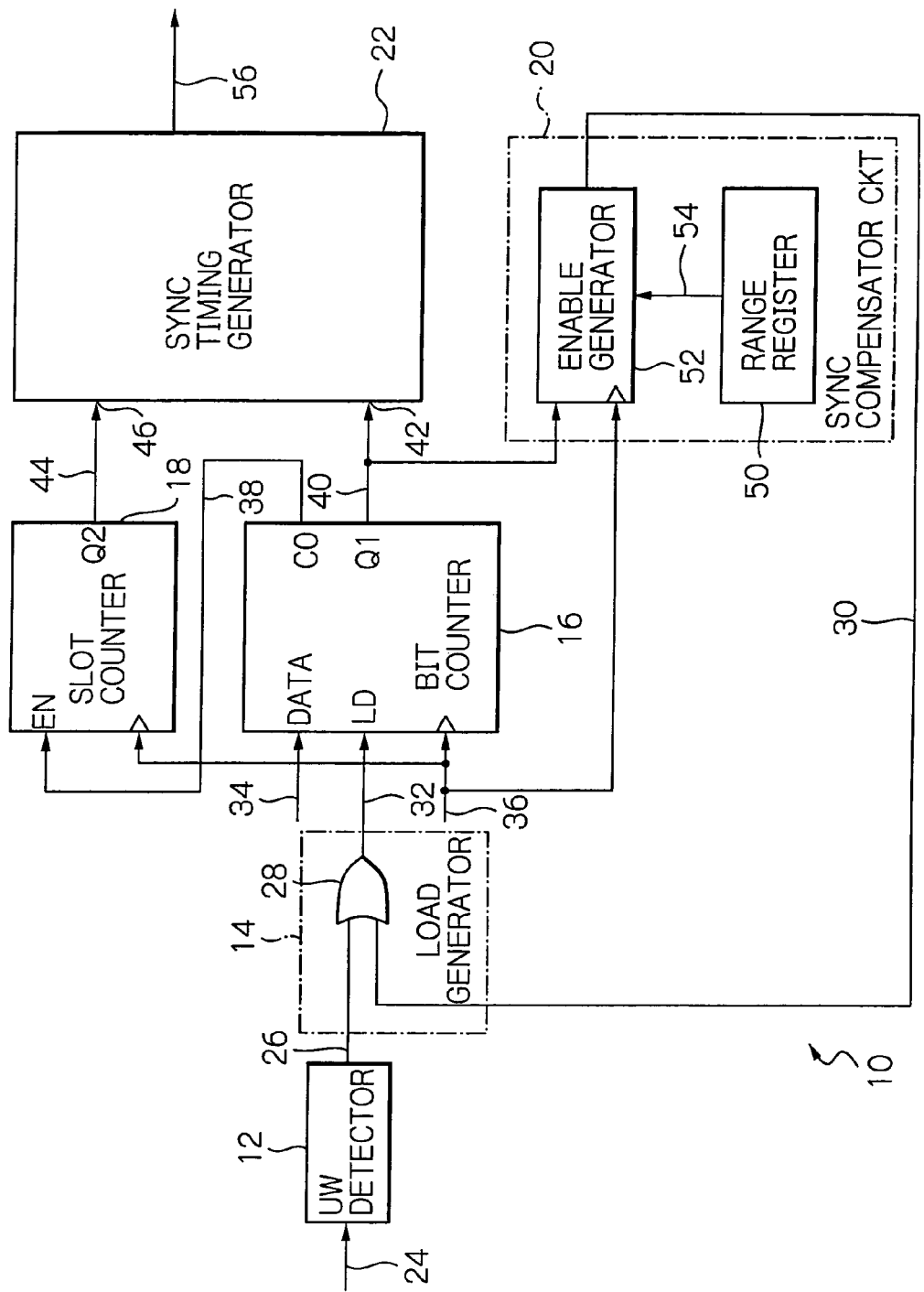
FIG. 1 is a schematic block diagram showing a preferred embodiment to which applied is the synchronous compensator according to the invention.

AS shown in FIG. 1, the synchronous compensator 10 comprises a unique word (UW) detector 12, a load generator 14, a bit counter 16, a slot counter 18, a synchronous compensator circuit 20 and a sync timing generator 22 interconnected as illustrated. The UW detector 12 has the function of detecting a UW word in received data 24. In the description below, signals are designated with the reference numerals of connections on through which they appear. The UW detector 12 supplies the load generator 14 with a UW detection signal 26 indicative of a UW word thus detected. The load generator 14 includes a dual-input logical sum (OR) gate circuit 28, which operates the positive logical sum on its dual inputs. The logical sum gate circuit 28 has its one terminal receiving the UW detection signal 26 and its other terminal receiving an enable signal 30 from the synchronous compensator circuit 20 as described later. The load generator 14 applies the resultant of the logical sum operation as a load signal 32 to a load terminal LD of the bit counter 16.

The bit counter 16 has, in addition to the load terminal LD, its data terminal DATA, clock terminal 36, carry-output terminal CO and output terminal Q1. To the data terminal DATA, fixed data 34, such as a defined value "31", are applied. The bit counter 16 counts up, or increments, in response to the clock signal 36 supplied to its clock terminal. The bit counter 16 has its full count of 240 to output a carry-output signal 38 from its carry terminal CO to the slot counter 18 when it includes a count value exceeding "239". The bit counter 16 outputs the eight bits [7:0] of count 40 from its output terminal Q1 to one terminal 42 of the sync timing generator 22 and also to the synchronous compensator circuit 20.

The slot counter 18 has the function of indicating the slot number and incrementing in response to the clock signal, while being primed with the carry-output signal 38. Then, the slot counter 18 supplies its count 44 to another terminal 46 of the sync timing generator 22.

The synchronous compensator circuit 20 has the function of generating the enable signal 30 whenever the system falls in the range wherein synchronization may be corrected or adjusted, which will be described later. To implement this function, the synchronous compensator circuit 20 comprises a range register 50 and an enable generator 52 interconnected as shown. The range register 50 is adapted to output a registered value 54 defining a range to enable synchronous compensation. The enable generator 52 is adapted for receiving, along with the registered value 54, the count 40 and the clock signal 36. The enable generator 52 uses the count 40 to predict the timing when the next detection signal is supplied. Furthermore, the enable generator 52 generates the enable signal in a period of time, i.e. range, in which synchronous compensation is available and which is defined by the registered value 54 having its central position set at the predicted timing, or position.

To the sync timing generator 22, the counts 40 and 44 are supplied from the bit and slot counters 16 and 18, respectively. The sync timing generator 22 generates and outputs plural timing signals on the basis of the counts 40 and 44 supplied thereto.

The illustrative embodiment is thus characterized by the synchronous compensator 10 including the load generator 14 and the synchronous compensator circuit 20.

Next, the operation of the synchronous compensator 10 will be described with the aid of the timing charts as shown in FIGS. 2 and 3. In FIGS. 2 and 3, the line (a) represents the count 44, i.e. the output of the slot counter 18.

In FIGS. 2 and 3, the line (b) represents the count [7:0] 40 outputted from the bit counter 16. The count [7:0] 40 from the bit counter 16 is applied to the sync timing generator 22 and the enable generator 52 of the synchronous compensator circuit 20. The fixed data 34 are also applied to the enable generator 52. The fixed data 34 are set to a value of, for example, "31". For the clarification, the value "31" is shown in black-and-white reversal in the line (b). By means of the count [7:0] 40, the enable generator 52 predicts the timing when the next detecting signal 26 is inputted.

More specifically, the prediction by the UW detection is implemented by supplying the load signal 32 just before the fixed data 34 are loaded. As a result, the UW detection is predicted at the time, i.e. position, at which the counter 16 reaches its count "30", as shown in the line (c). To the enable generator 52, the registered value 54 indicating a predetermined range is supplied from the range register 50. In this embodiment, the registered value 54 is ±8 bits around the position corresponding to the predicted value "30", as shown in FIGS. 2A and 2B. The enable generator 52 outputs the enable signal 30 having its level "Low" within the predetermined range, i.e. the range between the times T1 and T2, to the other terminal of the logical sum gate circuit 28, as shown in the line (d).

On the other hand, the UW detector 12 detects the UW word in the received data 24 and supplies the one terminal of the logical sum gate circuit 28 with the UW detection signal 26 having its level "Low" only during the period of time associated with the detection of the UW word. The UW detection signal 26 appears at the position four sections before the predicted position for UW detection, i.e. at the value "26", as shown in FIGS. 2 and 3, the line (e). As a result, the load signal 32 is generated at the same timing as that of the UW detection signal, as seen from the lines (f) and (e).

The bit counter 16 outputs the count 40 corresponding to the inputted clock signal 36 from its output terminal Q1 to the one terminal 42 of the sync timing generator 22. The slot counter 18 increments in response to the clock signal 36 supplied thereto with its port EN enabled with the carry-output signal 38 supplied from the bit counter 16. The slot counter 18 supplies this count 44 to the other terminal 46 of the sync timing generator 22. The sync timing generator 22 generates and outputs data in the form of various timing signals 56 on the basis of the counts 40 and 44 supplied thereto.

Figure 3B:
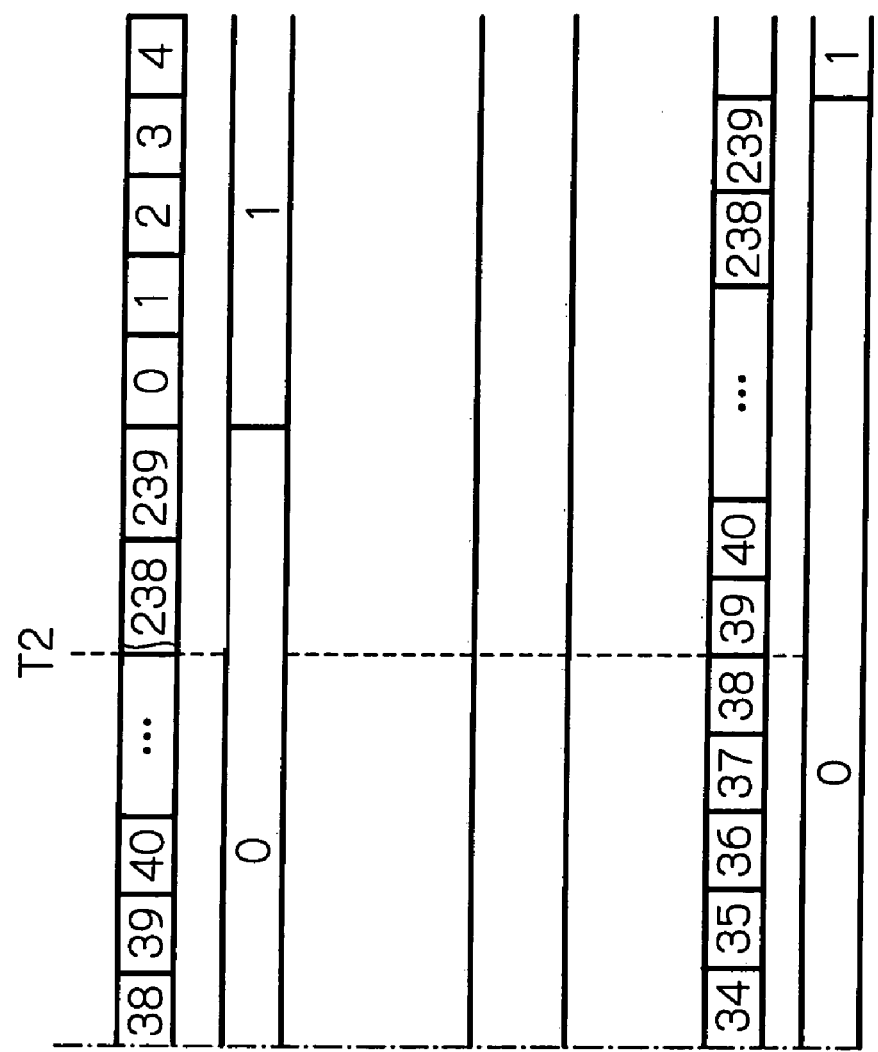

Even when the UW detection signal 26 represents the deviation of −4 bits from the predicted position for UW detection, the signal still situates within the range preset by the enable signal 30, thus conducting the compensation. In this case, as shown in FIG. 3A, the line (g), the bit counter 16 receives the data 34 set to replace the value "27" following the value "26" after the timing T3 to count up the count 40 therefrom. In other words, the count 40 is shifted from the value "27" to the value "31". Accordingly, the count 44 in the slot counter 18, FIG. 3A, the line (h), shifts in phase timing by −4 bits, as shown in FIG. 3B, and the phase goes on faster by 4 bits. Thus the counts 40 and 44 having the phase thereof shifted by −4 bits are supplied to the sync timing generator 22. The sync timing generator 22 thus shifts the timing by −4 bits in phase and generates the corrected timing signals accordingly.

When the UW detection signal 26 appears at the count "19", not shown, deviating by −11 bits from the predicted position for UW detection, the load signal 26 represented in FIGS. 3A and 3B, the line (j), is masked by the enable signal 30. Therefore, the level of the load signal 32 becomes "High" across the entire period of time shown in FIGS. 3A and 3B. Thus the UW detection signal 26 is neglected. As a result, the phase correction or adjustment is not carried out, as clearly seen from lines (k) and (l).

By setting the range for synchronous compensation as described above, if a UW word is detected outside the predetermined range, the phase correction is not carried out but a radio signal which is supposed to be reflected waves can be prevented from being caught as directly received waves.

Figure 4:
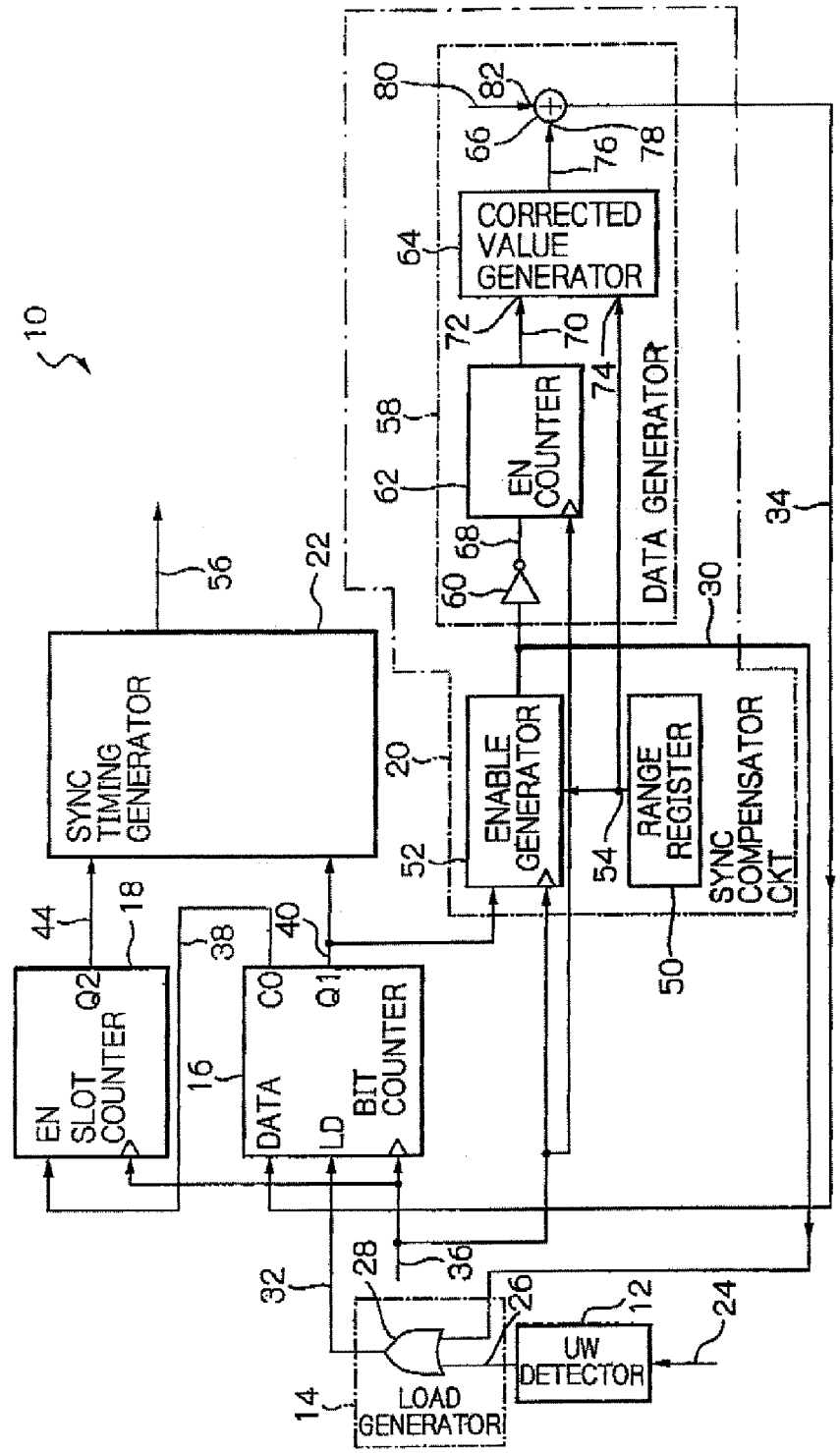
FIG. 4 is a schematic block diagram of an alternative embodiment to which applied is the synchronous compensator according to the invention.

In the following, an alternative embodiment of the synchronous compensator 10 according to the invention will be described in detail with reference to FIG. 4. The configuration of the alternative embodiment may essentially be the same as the configuration of the previous embodiment except that the alternative embodiment comprises a data generator 58 added. The data generator 58 has the function of adjusting the data 34 to be loaded into the bit counter 16 correspondingly to the phase shift from the predicted position for UW detection. To accomplish this function, the data generator 58 comprises an inverter gate circuit 60, a counter 62, a corrected value generator 64 and an adder 66 interconnected as shown.

The inverter gate circuit 60 has the function to invert the level of the enable signal 30 supplied from the enable generator 52. The inverter gate circuit 60 outputs the inverted enable signal 68 to the counter 62. The counter 62 receives the inverted enable signal 68 on its enable terminal EN. To the counter 62, the clock signal 36 is also applied as a counting clock. The counter 62 increments its count 70 in response to the clock signal 36 received with its enable port EN primed with the "High" level to output the count 70 to one terminal 72 of the corrected value generator 64.

The corrected value generator 64 has the function to calculate a relative distance from the predicted position for UW detection on the basis of the count 70 and the registered value 54 indicating the range, and to generate the corrected value 76 according to the calculated relative distance. The corrected value generator 64 is supplied with the count 70 and the registered value 54. The corrected value generator 64 supplies one terminal 78 of the adder 66 with the corrected value 76 thus generated.

The adder 66 has the function for adding the corrected value 76 to a fixed value 80 to produce the corrected data 34. The adder 66 has its other terminal 82 supplied with the fixed value 80. Here, the fixed value 80 corresponds to the fixed value 34 of the illustrative embodiment described earlier. The adder 66 feeds the bit counter 16 with the corrected data 34.

The inclusion of the circuitry described above in the synchronous compensator 10 makes it possible to change and limit the amount of correction or adjustment which is available at a time.

Figure 5:
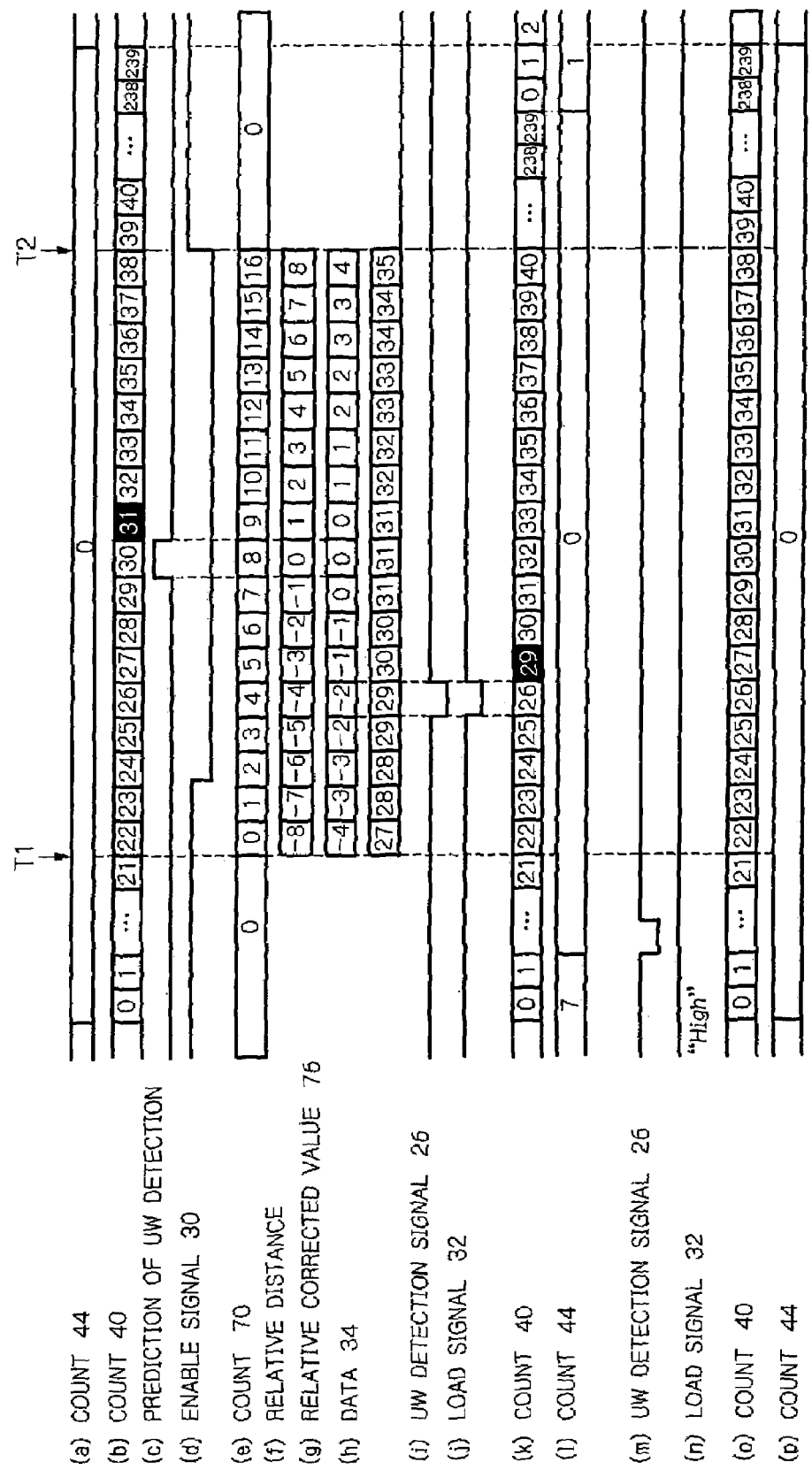
FIG. 5 is a timing chart useful for understanding the operation of the synchronous compensator shown in FIG. 4.

Next, the operation of the synchronous compensator 10 will be described. In FIG. 5, the lines (a) through (d) represent the counts 44 and 40, the predicted position for UW detection and the enable signal 30, respectively.

During the enable period from the time T1 to the time T2, the counter 62 counts up 17 times from the value "0" to the value "16" to output the resultant count to the corrected value generator 64, as shown in FIG. 5, the line (e). The corrected value generator 64 calculates the relative distances from the predicted position for UW detection. By this calculation, the value "8" of the count 70 shown in the line (e) is replaced with the value "0" to obtain the relative distances of the value "−8" to the value "8", as shown in the line (f). Further, by dividing each of the relative distance by two, the corrected value generator 64 generates corrected values corresponding to the relative distances, as shown in the line (g), to output them to the one terminal 78 of the adder 66. The adder 66 outputs the values "27" to "35" in the form of data 34, as shown in the line (h).

Right after the UW word has been detected and then the load signal 32 shown in FIG. 5, the line (j), has been supplied, the bit counter 16 takes out the value "29" from the data 34 and thus corrects the phase, as shown in the line (k). By this correction, the value "27" after the UW detection is replaced with the value "29" to thereby shift the phase by "−2" bits. This phase correction or adjustment results in the counts 40 and 44, as shown in the lines (k) and (1).

When the position at which the UW detection signal 26 appears is outside the range indicated by the registered value, as shown in the line (m), the level "High" of the load signal 32 is kept, as shown in the line (n). This means that the synchronous compensation is not made after the UW detection, as done with the embodiment described earlier. Therefore, the counts 40 and 44 shown in the lines (o) and 5 and (p) are the same as the values shown in the lines (b) and (c).

The operation described above allows the amount of synchronous compensation changeable according to the phase shift to thereby prevent the synchronization from being abruptly corrected at a time. Consequently, out-of-synchronism may rarely happen.

Figure 6:
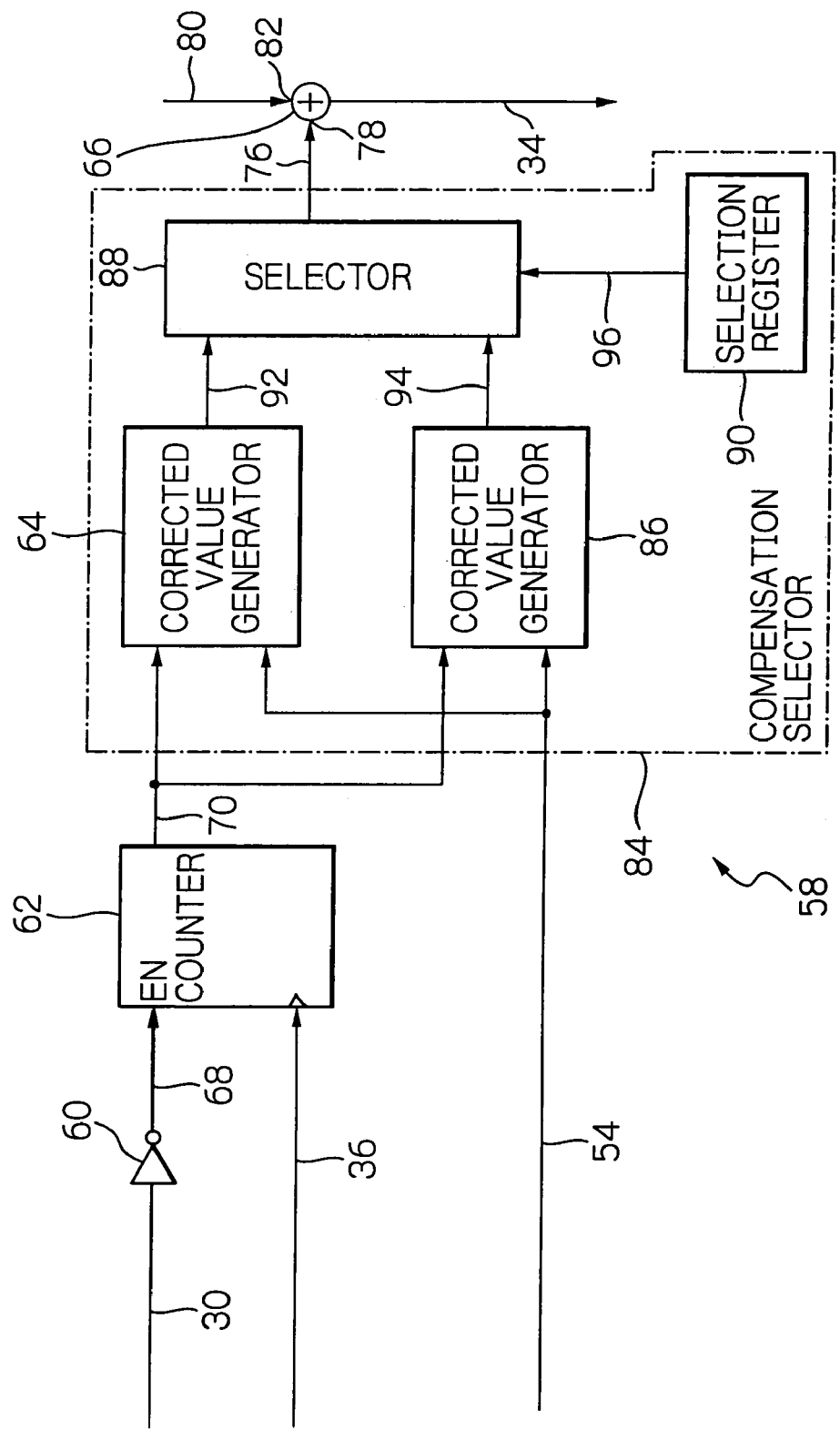
FIG. 6 is a schematic block diagram showing an alternative embodiment of a data generator included in the synchronous compensator shown in FIG. 4.

Further, an alternative embodiment of the data generator 58 will be described below, which is a constituent element of the synchronous compensator 10 shown in FIG. 4. As shown in FIG. 6, the data generator 58 comprises an inverter gate circuit 60, a counter 62, a compensation selector 84 and an adder 66 interconnected as illustrated. The compensation selector 84 includes two corrected value generators 64 and 86, a selector 88, and a selection register 90 interconnected as illustrated. The corrected value generators 64 and 86 have function to generate different relative corrected values 92 and 94, respectively. The corrected value generators 64 and 86 output the relative corrected values 92 and 94 generated to the selector 88, respectively.

The selector 88 has the function to select either one of the relative corrected values 92 and 94 thus supplied thereto to output the selected one. This selection is dependent upon a selector value 96 provided from the selection register 90. The selector 88 outputs the selected relative corrected value to one terminal 78 of the adder 66 as a corrected value 76. The selection register 90 is adapted to provide the selector 88 with the selector value 96. The selections are thus increased in number.

Figure 7:
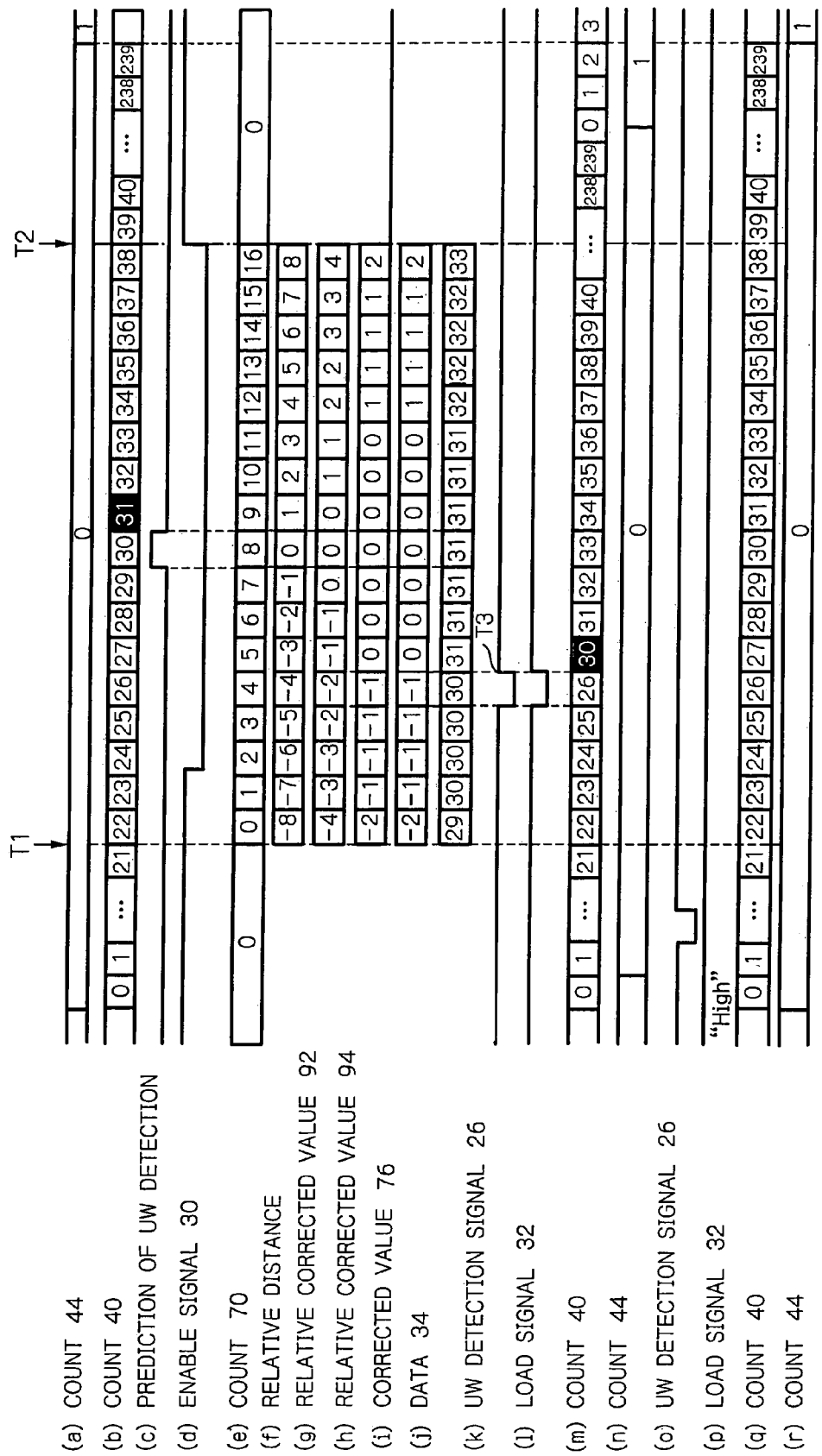
FIG. 7 is a timing chart useful for understanding the operation of the synchronous compensator including the data generator shown in FIG. 6.

Next, the operation of the synchronous compensator 10 will be described, which includes the alternative embodiment of the data generator 58 described above, with reference to FIG. 7. In FIG. 7, the lines (a) to (f) are depicted under the same situation as FIG. 5, the lines (a) to (f), respectively. Description on FIG. 7, the lines (a) to (f), will therefore be omitted. The relative corrected values 92 shown in FIG. 7, the line (g), are integers obtained as the result of the division of the relative distances by two in the corrected value generator 64. Also, the relative revised values 94 shown in the line (h) are integers obtained resultantly from the division of the relative distances by four in the corrected value generator 86.

The selector 88 is applied with the relative corrected values 92 and 94. The selector 88 selects either one of the relative corrected values 92 and 94 according to the selector value 96 supplied from the selection register 90. In this example, the relative corrected value 94 is selected as the corrected value 76, as shown in the line (i). The adder 66 adds the fixed value 80 to the corrected value 76 and outputs the data 34, as shown in the line (j).

The UW detection signal 26 shown in FIG. 7, the line (k), and the load signal 32 shown in the line (l), appear at the same timing. As a result, the bit counter 16 will include, after the UW detecting position "26", the value "30" instead of the value "27" that would otherwise be included. Therefore, the phase is shifted by "−3" bits. This phase correction or adjustment is transferred to the count 44 of the slot counter 44, as shown in the line (n). Thus the phase correction by "−3" bits is accomplished, instead of the phase correction by "−4" bits which would otherwise be conducted in the prior art.

On the other hand, when the UW detection signal 26 is outside the enable range, the load signal 32, the counts 40 and 44 shown in FIG. 7, the lines (p) to (r), behave similarly to those shown in FIG. 5, the lines (n) to (p), thus conducting no synchronous compensation.

The provision of plural corrected values and the operation as described above permits the number of selections to increase, and the most appropriate selection of the corrected values is thus accomplished for a variety of communication conditions.

With the above-described embodiments, the synchronous compensator 10 makes the load generator 14 load the data 34 into the bit counter 16 correspondingly whether the detecting signal 26 from the UW detector 12 falls within or out of the range indicated by the enable signal 30 from the synchronous compensator circuit 20. The detecting signal 26 appearing far from the normal position is thus excluded, thereby compensating for erroneous synchronization appropriately. Specifically, the synchronous compensation is conducted only on the basis of normally received signal waves without picking up abnormal waves supposed as reflected waves.

With the synchronous compensator circuit 20 thus structured, the registered value 54 indicating a compensation range to be enabled is outputted from the range register 50 to the enable generator 52, the compensation range is set on the basis of the value 54 supplied to the enable generator 52, the timing when the next detecting signal is supplied is predicted, and the enable signal is generated which is associated with the range of synchronous compensation having its central position set on the predicted position. The enable signal can thereby be generated which defines the compensation range used in the synchronous compensator 10, and the ranges can thus be provided which permit and inhibit the synchronous compensation.

The synchronous compensator circuit 20 thus comprises the corrected value generator 64 for defining the amount of correction required at a time, thereby making the amount of synchronous compensation changeable according to the phase shift, and therefore preventing the synchronization from being abruptly corrected.

Further, the synchronous compensator circuit 20 comprises a plurality of corrected value generators 64 and 86, and the selector value 96 is supplied from the selection register 90 to the selector 88. Either one of the corrected values 92 and 94 supplied from the plural corrected value generators 64 and 86 is selected in response to the selector value 96 supplied to the selector 88. The selections for the corrected value are thus increased in number, thereby implementing synchronous compensation by employing a corrected value more appropriate under various communication conditions.

The entire disclosure of Japanese patent application No. 2004-155843 filed on May 26, 2004, including the specification, claims, accompanying drawings and abstract of the disclosure is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A synchronous compensator comprising:

a detector for detecting a specific word to output a detection signal;

a first counter loaded with data supplied for incrementing in response to the detection signal and outputting a carry signal;

a second counter for incrementing according to the carry signal;

a sync timing generator for generating a sync timing signal according to outputs supplied from said first and second counters;

a sync compensation circuit for generating an enable signal associated with a compensation range on a basis of the output from said first counter and a value of a range to enable; and a load generator for generating a loading signal for loading said first counter with the data on the basis of the enable signal and the detection signal, said sync compensation circuit comprising:

a storage for storing a value indicating the compensation range to enable;

an enable generator for setting the compensation range on the basis of the value supplied, predicting a timing, when the detection signal is supplied next, to generate the enable signal, and generating the enable signal for a sync compensation associated with the compensation range having a central position thereof set to a predicted position for the output from said first counter; and a data generator for defining an amount of correction performed at a time, said data generator comprising:

an inverter for inverting output signals from said enable generator;

an enable counter for counting inverted output signals to output a count value;

a corrected value generator for generating a relative correction value associated with the compensation range on the basis of the count value from said enable counter; and an adder for adding a fixed value to the generated relative correction value.

2. The compensator in accordance with claim 1, wherein said data generator further comprises a compensation selector for generating a plurality of relative correction values associated with the compensation range on the basis of the count value output from said enable counter, and selecting one of the plurality of relative correction values generated, said adder adding the fixed value to the selected relative correction value.

3. The compensator in accordance with claim 2, wherein said compensation selector comprises:

a plurality of corrected value generators for each generating a respective relative correction values;

a selector for selecting one of the respective relative correction values; and a selection register for switching said selector in response to the detection signal.

* * * * *